(12) United States Patent
Fierke et al.

(10) Patent No.: US 6,362,854 B1
(45) Date of Patent: Mar. 26, 2002

(54) EFFECTING VIDEO TRANSITIONS BETWEEN VIDEO STREAMS WITH A BORDER

(75) Inventors: John R. Fierke, Hopkinton; Marshall Richard Houskeeper, Upton; Kevin Hinchey, Northborough, all of MA (US)

(73) Assignee: Media 100 Inc., Marlborough, MA (US)

( * ) Notice: Subject to any disclaimer, the term of this patent is extended or adjusted under 35 U.S.C. 154(b) by 0 days.

(21) Appl. No.: 09/440,965

(22) Filed: Nov. 16, 1999

(51) Int. Cl.$^7$ ................................................. H04N 9/74
(52) U.S. Cl. ....................................... 348/584; 348/598
(58) Field of Search ...................... 348/584, 586, 348/589, 590, 591, 593–596, 597, 598, 500; 345/113, 114, 629, 630; H04N 9/74

(56) References Cited

U.S. PATENT DOCUMENTS

| | | | |
|---|---|---|---|
| 3,604,849 A | 9/1971 | Ole Skrydstrup | 178/6.8 |
| 3,941,925 A | 3/1976 | Busch et al. | 178/6.8 |
| 4,205,346 A | 5/1980 | Ross | 358/181 |
| 4,437,092 A * | 3/1984 | Dean et al. | 345/22 |
| 4,698,666 A | 10/1987 | Lake, Jr. et al. | 358/22 |
| 4,751,579 A | 6/1988 | Okunishi et al. | 358/183 |
| 4,758,892 A | 7/1988 | Bloomfield | 358/183 |
| 4,764,809 A | 8/1988 | Haycock et al. | 358/183 |
| 4,782,392 A | 11/1988 | Haycock et al. | 358/183 |
| 4,805,022 A | 2/1989 | Abt | 358/183 |
| 4,809,072 A | 2/1989 | Pohl | 358/183 |
| 4,823,183 A | 4/1989 | Jackson et al. | 358/22 |
| 4,853,784 A | 8/1989 | Abt et al. | 358/181 |
| 4,855,834 A | 8/1989 | Cawley et al. | 358/183 |
| 4,862,272 A | 8/1989 | Karlock | 358/181 |
| 4,963,977 A * | 10/1990 | Jackson et al. | 348/578 |
| 4,991,014 A | 2/1991 | Takahashi et al. | 358/183 |
| 5,008,755 A | 4/1991 | Brain | 358/183 |
| 5,027,213 A | 6/1991 | Kamin | 358/183 |
| 5,109,280 A | 4/1992 | Karlock | 358/181 |
| 5,181,100 A | 1/1993 | Hodgson | 358/37 |
| 5,184,222 A | 2/1993 | Yanagisawa | 358/183 |
| 5,185,666 A | 2/1993 | Capitant et al. | 358/183 |
| 5,305,108 A | 4/1994 | Trytko | 348/594 |
| 5,353,068 A | 10/1994 | Moriwake | 348/585 |
| 5,412,479 A | 5/1995 | Alig et al. | 348/594 |
| 5,416,529 A | 5/1995 | Lake | 348/590 |
| 5,426,467 A | 6/1995 | Moriwake et al. | 348/584 |
| 5,432,528 A | 7/1995 | Ritter | 345/115 |
| 5,515,110 A | 5/1996 | Alig et al. | 348/594 |
| 5,528,310 A | 6/1996 | Peters et al. | 348/593 |
| 5,675,392 A | 10/1997 | Nayebi et al. | 348/584 |
| 5,812,216 A | 9/1998 | Peters et al. | 348/593 |
| 5,825,433 A | 10/1998 | Yamada et al. | 348/584 |
| 5,905,539 A | 5/1999 | Angell | 348/594 |

FOREIGN PATENT DOCUMENTS

| | | |
|---|---|---|
| GB | 2 323 735 A | 9/1998 |
| WO | WO 98/46013 | 10/1998 |

* cited by examiner

*Primary Examiner*—Michael Lee
(74) *Attorney, Agent, or Firm*—Fish & Richardson P.C.

(57) ABSTRACT

Apparatus and method for combining first and second video streams and a border color into a combined output video stream using a multiplexer and a video combiner. The multiplexer receives the first and second video streams as input and outputs a selected video stream in response to a control signal. The video combiner receives the border color at a first input and the selected video stream from the multiplexer at a second input and outputs a combined output based upon a key received at a key input.

23 Claims, 4 Drawing Sheets

EFFECTING VIDEO TRANSITIONS BETWEEN VIDEO STREAMS WITH A BORDER

BACKGROUND OF THE INVENTION

The invention relates to effecting video transitions between video streams with a border between the two partial images being displayed.

In editing of video in the creation of a video program, it is often desirable to provide a gradual transition from one video stream to another video stream. For example, in a wipe transition, a line may move across the screen from left to right, with the old scene gradually disappearing at the right while more and more of the new scene appears at the left. In a so-called "iris wipe," the boundary is an expanding circle, and one video stream appears in an expanding circle, and the other is outside of the circle. A solid color could also be used as one stream to provide an image that gradually appears or disappears across the screen or an image that gradually expands or contracts.

Instead of directly transitioning from one video stream to another, there can be a border between the two which might move from one side of the screen to the other. FIG. 1 shows a wipe without a border going left to right across a screen; there is a transition from one video stream directly into the other. FIG. 2 shows the wipe with a border of a uniform color, with one transition from one video stream to the border, and another transition from the border to the other video stream.

Referring to FIG. 3, there is shown video combiner 10, which is a complex circuitry with arithmetic functions that can be used to combine video streams into a combined stream, and thus can be used for a transition from one video to another. Video combiner 10 has a first video input 12 for a first video stream, a second video input 14 for a second video stream, a key input 16 to receive key values indicating how the two inputs are to be combined, and a video output 18 for the output video that is some combination of the two inputs. The video streams include frames (each frame providing an image for a screen) made up of horizontal lines, each of which includes individual "pixels" (picture elements) across the line. Each pixel value includes a number of bit values that describe the color and intensity at that particular pixel at a particular time. New frames are provided at the video rate, e.g., 30 frames per second, and the video streams include sequential digital data describing sequential pixel values for lines of video data in a frame. The pixels for the first and second video streams that are input to combiner 10 are synchronized, as are the associated key values. The key value for a given pixel indicates whether the output for that pixel is the input from one stream or the other stream or a combination of the two. The video combiner can be used to provide a gradual transition from one stream to the other, with an increasing percentage of the new stream and decreasing amounts of the old stream over a number of adjacent pixels. This is known as softness.

While a unique key value could be stored and accessed for each pixel in each frame, to reduce bandwidth, a single table of gamma values (also referred to as "gradient values" herein) can be used. For example, a single table with one value for each pixel can be used to define the wipe over the sequence of frames. In the table, the gamma value essentially indicates the time at which the transition appears at that pixel. FIG. 4 is a simplified diagram of a table 20 of gamma values for the wipe shown in FIG. 1. (A real table for NTSC would have 720 horizontal entries and 480 vertical entries.) As the time goes from frames 1 to 2 to 3 etc, a "threshold" value similarly goes from 1 to 2 to 3 etc. The threshold is compared to the value in the table to determine the key value (e.g., a 0 key value meaning all of video stream A, a 100 key value meaning all of video stream B, and a 50 key value meaning equal amounts of A and B) that is fed to the video combiner. The key values that are generated cause the video output to switch over from one video input to the other. As the threshold increases (as the frame numbers increase), the boundary of the transition provided by use of the FIG. 4 table moves to the right. The following algorithm employs a direct comparison that provides an abrupt transition from the first video stream to the second.

If (gradient<threshold) then all video A, else all video B.

As noted above, softness can be added to the key values generated so that the change from one video to the other is not abrupt but instead is gradual (with decreasing amounts of video B and increasing amounts of video A) in a discrete number of adjacent pixels as the transition passes a pixel location. The key value to the video combiner determines the percentage of video A or video B in the output video.

Transitions with borders, as in FIG. 2, have been provided in the past by using two video combiners 22, 24, a first video combiner 22 for combining video streams A and B and a second combiner 24 for combining the border, as shown in FIG. 5. In this apparatus, two video combiners, which are complex circuits, must be used. Also, two different gradient key streams must be provided, one to control video combiner 22 and one to control video combiner 24.

SUMMARY OF THE INVENTION

The invention features, in general, combining first and second video streams and a border color into a combined output video stream using a multiplexer and a video combiner. The multiplexer receives the first and second video streams as input and outputs a selected video stream in response to a control signal. The video combiner receives the border color at a first input and the selected video stream from the multiplexer at a second input and outputs a combined output based upon a key value received at a key input. This results in efficient, cost effective use of circuitry when combined multiple video streams with a border color.

Preferred embodiments of the invention may include one or more of the following features. In preferred embodiments a control signal RAM is connected to output the control signal to the multiplexer, and a key RAM is connected to output the key value to the video combiner. The control signal RAM and the key RAM are connected to be addressed by a sequence of gradient values from a gradient table. The key values stored in the key memory can gradually change over adjacent gradient values to desirably provide a gradual transition between a border color and a video stream input to the video combiner. The values in the control signal RAM and key RAM can be updated between frames. Alternatively, a subtracter or adder can be used to subtract an adjustment value that changes between frames from the values in a gradient value stream.

Embodiments of the invention may include one or more of the following advantages. Borders can be achieved in video wipes without the need for a second video combiner, which is replaced by a simple multiplexer, and without the need for a second key stream, because the same key stream can be used to control the video combiner and the multiplexer. In addition, the system desirably provides adjustable, accurate softness at the border/video transitions.

Other features and advantages of the invention will be apparent from the following description of a particular embodiment thereof and from the claims.

DESCRIPTION OF THE PARTICULAR EMBODIMENTS

Figure 6:
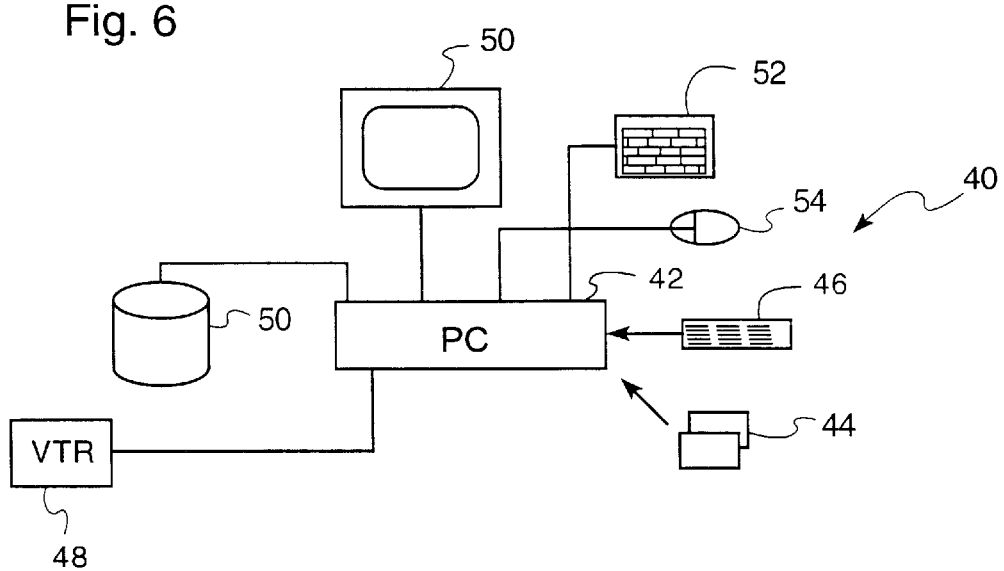
FIG. 6 shows a video editing system.

Referring to FIG. 6, video editing system 40 is implemented by computer 42, video editing software 44 running on computer 42, and video editing expansion card 46 plugged into computer 42. VTR 48 is a source of video streams that can be stored on disk or other mass storage 50 and randomly accessed by computer 42. Keyboard 52 and mouse 54 are user input devices, and monitor 56 is used to provide a video editing interface including display of a program being created. An additional monitor (not shown) can also be used to play the video program. U.S. Pat. Nos. 5,506,932; 5,488,695; 5,471,577; 5,909,250, which are hereby incorporated by reference, describe video editing systems implemented on a computer.

Figure 7:
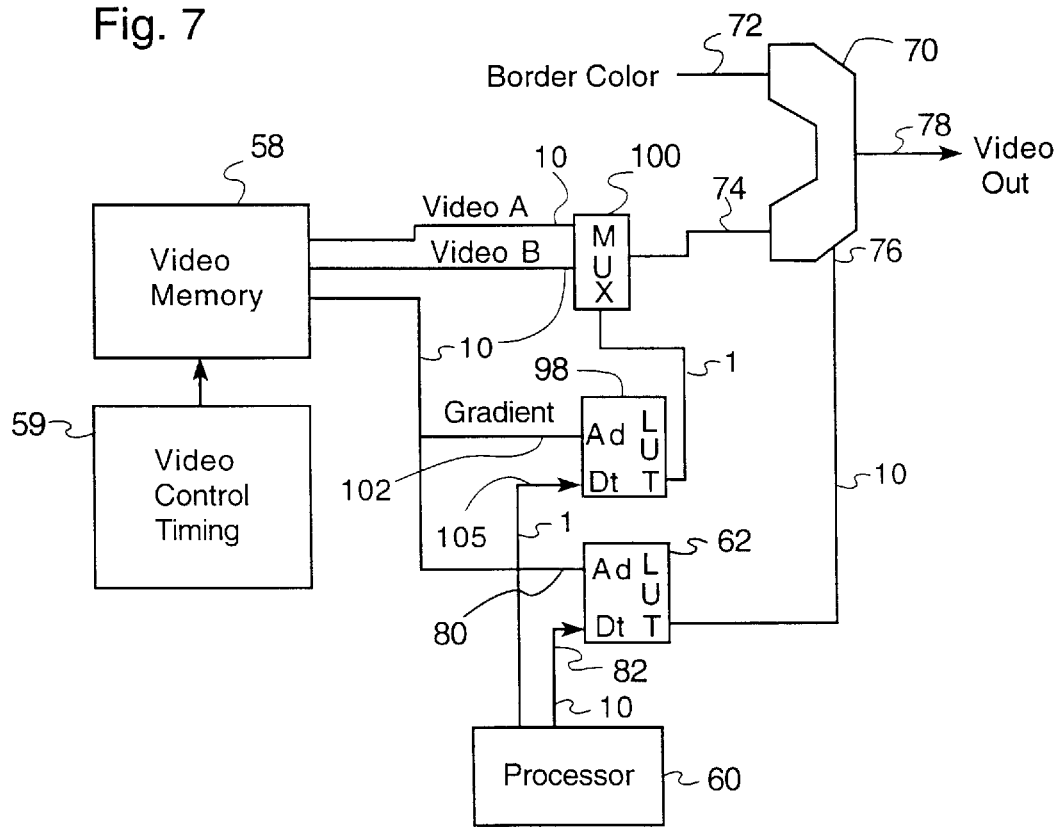
FIG. 7 shows some of the components of a video editing card used in the FIG. 6 system.

Referring to FIG. 7, video editing card 46 includes video memory 58, video control timing 59, on-board microprocessor 60, key memory 62 (a 10 bit×1024 random access memory look up table (RAM LUT)) and video combiner 70, which has first and second video inputs 72, 74, key input 76, and video output 78. Video memory 58 and video control timing 59 generate video streams A and B and a stream of gradient key values used to address LUT 62 and key memory 98 (a 1 bit×1024 RAM LUT). Key memory 62, also referred to as RAM LUT 62, and video combiner 70 are used to combine the border color at input 72 and video at input 74. Control signal memory 98, also referred to as RAM LUT 98, and multiplexer 100 are used to select either video stream A or video stream B. Video combiner 70 combines the output of the multiplexer 100 with the border color (e.g., a fixed color value). Combiner 70 can thus output the border color, or a selected video stream, or a combination of the two (at a gradual transition between the border and a video stream) depending on the key value provided at key input 76. RAM LUT 62 and one-bit RAM 98 both receive a stream of gradient values from video memory 58 at respective address pins 80, 102. A new gradient value, for the next pixel in the frame, is inputted with each pixel clock to the address pins, with the values input to RAM LUT 62 being delayed by one pixel clock. New data values from microprocessor 60 are inputted via data pins 82 into RAM LUT 62 and data pins 105 into 1-bit RAM 100 between each frame.

Multiplexer 100 and video combiner 70 shown on FIG. 7 handle the bits for a single Y, U, or V component, if handling YUV video, or a single R, G, or B component, if handling RGB video. There thus are three multiplexers 100 and three video combiners 70 that receive respective components of video A and B from video memory 58; the other two multiplexers also receive the same control signal from a single RAM LUT 98, and the other two video combiners 70 receive the same key values from a single RAM LUT 62.

Figure 1:
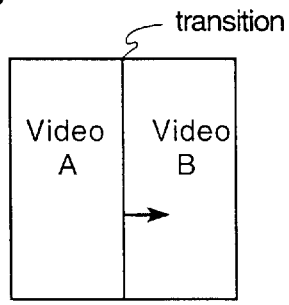
FIG. 1 shows a wipe transition from a first video stream to a second video stream without a border between the two.
Figure 2:
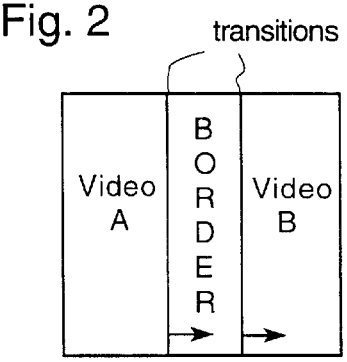
FIG. 2 shows a wipe transition from a first video stream to a second video stream with a border between the two.
Figure 3:
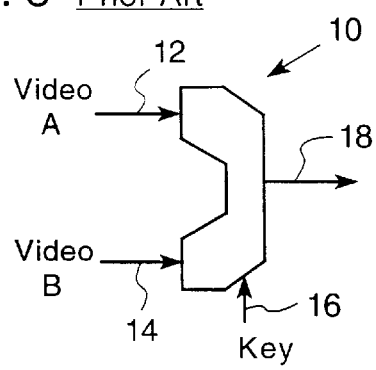
FIG. 3 is a block diagram showing a prior art video combiner for combining first and second video streams to create a wipe without a border.
Figure 4:
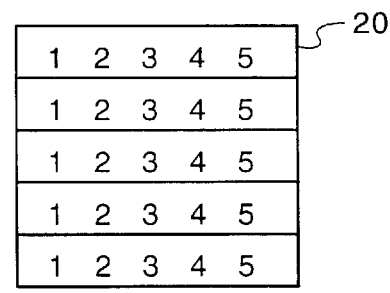
FIG. 4 is a diagram of a prior art table of gamma values used to generate key values for the wipe of FIG. 1.
Figure 5:
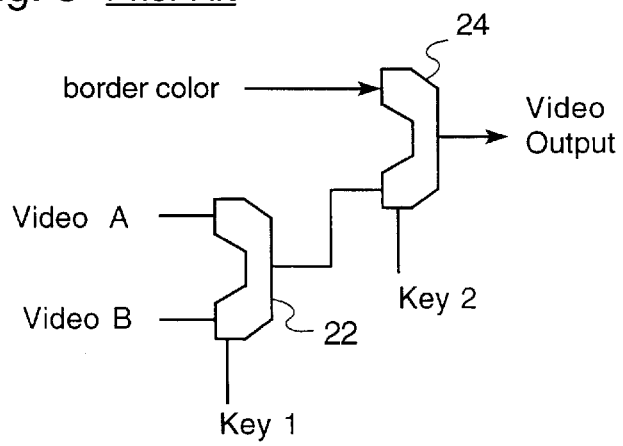
FIG. 5 is a block diagram showing a prior art video combiner for combining first and second video streams to create a wipe with a border.

As noted above, FIG. 4 shows a small portion of the gradient table that could be used to generate the bordered wiper shown in FIG. 2, which moves from left to right across the screen. The actual table for the example described herein has gradient values that continue to increase for additional pixels to the right, and there are additional rows below it with the same values. If the transition were to be something other than a vertical line, there would be different values in each row.

Figure 8:
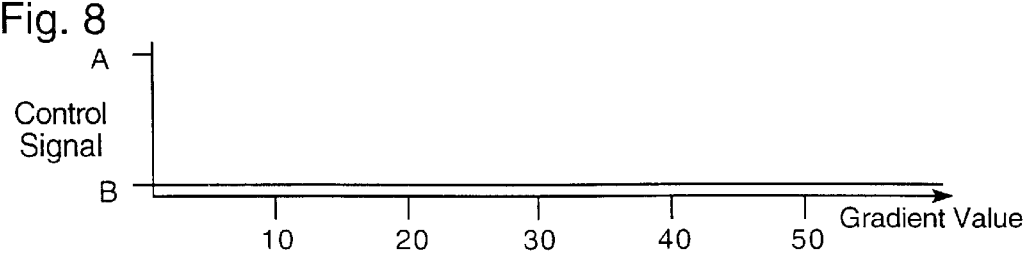
FIGS. 8, 10 and 12 are graphs showing the change in a multiplexer control signal with change in gradient value for particular frames at different times in a wipe.
Figure 10:
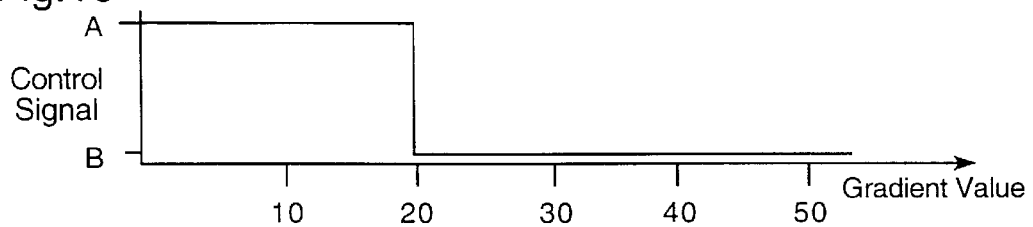
Figure 12:
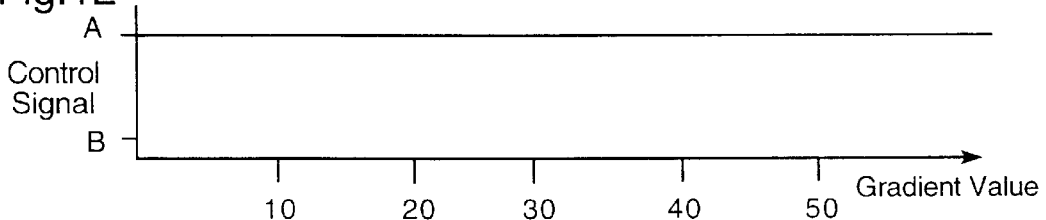

FIGS. 8, 10 and 12 show the 1-bit multiplexer control values stored in 1-bit RAM 98 at three different times during a wipe. These values are used to select between video A or B at multiplexer 100, and are loaded into RAM 98 for use with a particular frame and are updated between frames. FIG. 8 shows the values at an initial frame; FIG. 10 shows the values at a time part way through the wipe, and FIG. 12 shows the values at a time at the end of the wipe.

Figure 9:
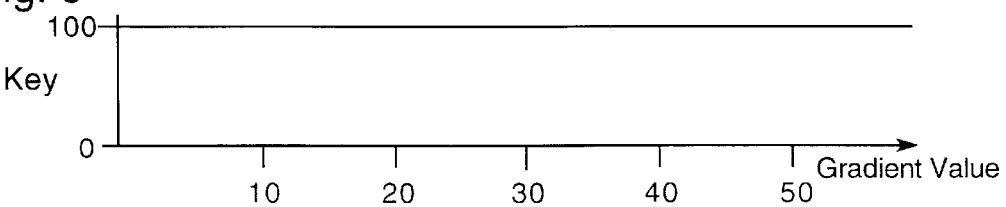
FIGS. 9, 11 and 13 are a graphs showing the change in a video combiner key value with change in gradient value for particular frames at different periods of time in a wipe.
Figure 11:
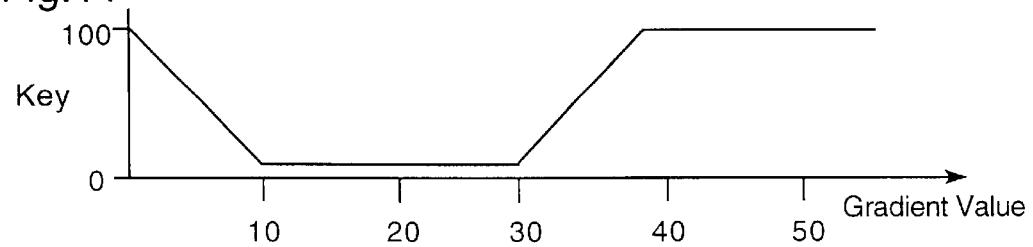
Figure 13:
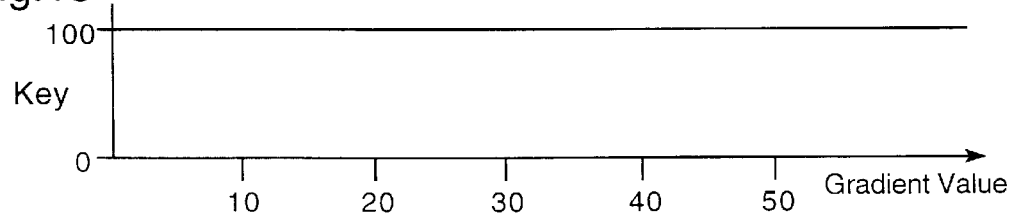
Figure 14:
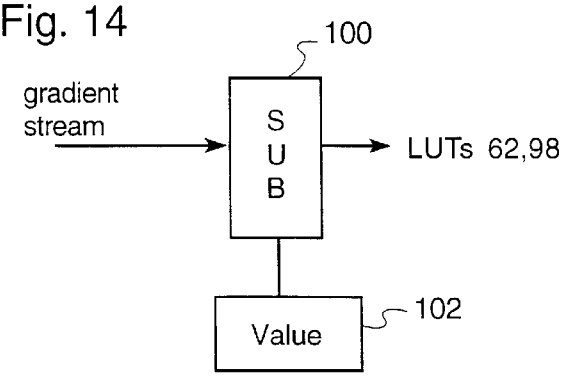
FIG. 14 shows components used in an alternative embodiment.

FIGS. 9, 11 and 13 show the key values stored in RAM LUT 62 at times corresponding to FIGS. 8, 10 and 12 respectively. These values are used to select the percentage amounts of the border color and video (A or B from multiplexer 100), and are loaded into RAM LUT 62 for use with a particular frame and are updated between frames. FIG. 9 shows the values at an initial frame; FIG. 11 shows the values at a time part way through the wipe, and FIG. 13 shows the values at a time at the end of the wipe.

During operation, video memory 58 is controlled to sequentially read gradient values from table 20 (FIG. 4) stored therein (for all pixels in each line for all lines) and is also controlled to provide video streams A and B. Video memory 58 includes buffering in order to provide the two video streams and the gradient key stream. Gradient table 20 has the same number of horizonal lines and the same number of gradient values in each line as there are lines and pixels in a frame of video. The gradient values are provided in synchronization with the pixel values for video streams A and B at the inputs to multiplexer 100; thus, the gradient values of the gradient table are provided at the same time that the corresponding pixel values arrive, though the gradient values are read one pixel clock prior to arrival of the video pixel value owing to pipeline delays. The stream of gradient values is used to address RAM LUT 62 to provide a stream of key values to video combiner 70. The same stream of gradient values is also used to address RAM 98 to provide a stream of 1-bit control values to multiplexer 100. At each new pixel clock, the pixel values for the next pixel in the line are provided at the video A and video B inputs to multiplexer 100, and the corresponding 1-bit multiplexer control value is read from 1-bit RAM 98 and is applied to multiplexer 100. Also at each pixel clock, the pixel value for the previous pixel in the line is outputted from multiplexer 100 to input 74 to video combiner 70, and the corresponding key value is read from RAM LUT 62 and applied to key input 76. This key value is addressed by the gradient value for the prior pixel. At each pixel clock a new gradient value is read from the gradient table and applied to the address pins 80 of RAM LUT 62 and the address pins 105 of 1-bit RAM 98. The gradient value applied to address pins 80 is one pixel clock behind the gradient value applied to address pins 102.

In operation, instead of comparing the gradient values (of table 20) to an increasing threshold value (as in the prior technique described above), the gradient values are used to address RAM LUT 98 and RAM LUT 62. The wipe effect is caused by the new values for multiplexer control signal (FIGS. 8, 10, 12) and key value (FIGS. 9, 11, 13) that are written into RAM 98 and RAM LUT 62 for use with each new frame. At time 0 (the first frame), the gradient value 1 (at the left side of the screen) will map on FIGS. 8 and 9 such that only video (without border) will be outputted (FIG. 9), and it will be video B (FIG. 8). With subsequent frames, the values read into RAMS 62 and 98 cause border and transitions to start moving to the right from the left side of the screen. Thus FIGS. 10 and 11 show the control signal and key values that are loaded in RAM LUTs 98, 62 at a time part way through the wipe. Referring to FIG. 11, there is a gradual change from video B to the border color going from gradient values 40 to 30. There is all border color for gradient values 10–30. Note that at gradient value 20, the video stream changes from B at higher values to A at lower values. There is a gradual change from border to video A from gradient values 10–0. As the frame number increases with time, the border/video A transition (between 30 and 40 on FIG. 11), and the solid border (10 to 30 on FIG. 11) and video B/border transition (0 to 10 on FIG. 11) in front of it, all move to the right. Eventually, there is all video A, as shown in FIGS. 12 and 13.

An advantage of the invention is that borders can be achieved without the need for a second combiner (which is complex), which is replaced by a simple multiplexer. Because there are three components and video streams (for either YUV or RGB) the savings in circuitry are three-fold. There also is no need for a second key stream, because the same key stream can be used to control the video combiner and the multiplexer. In addition, the system desirably provides adjustable, accurate softness at the border/video transitions.

FIGS. 14–17 describe an alternative embodiment in which a subtracter is used on the gradient streams input to RAM LUTs 62 and 98 in order to avoid the need to replace the LUT data entries between frames. As shown on FIG. 14, the gradient values (from video memory 58 on FIG. 7) pass through subtracter 100, and a value provided by source of values 102 is subtracted from the gradient value that is then passed on to address pins 80 of RAM LUT 62 and address pins 102 of RAM LUT 98. Source 102 could be a counter that increments its output at each frame to provide a constantly moving wipe. The components shown on FIGS. 14–17 are controlled by processor 60.

Figure 15:
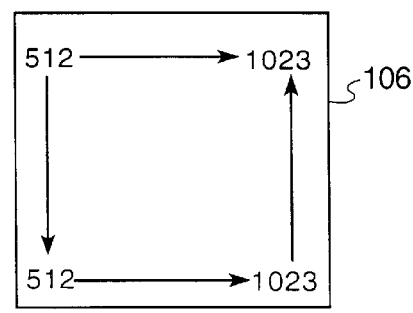
FIG. 15 shows a gradient table used with the FIG. 14 embodiment.
Figure 16:
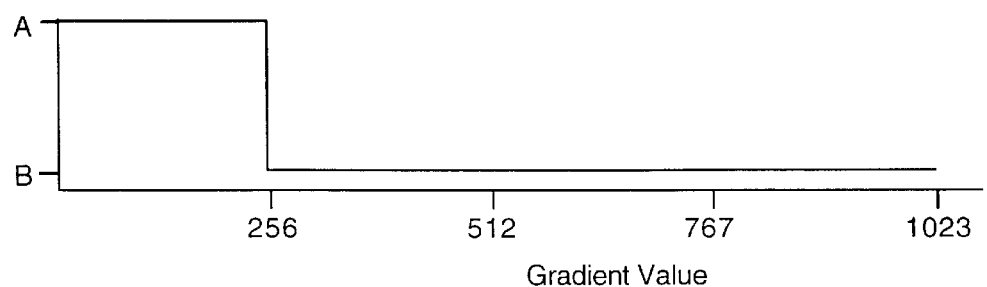
FIG. 16 is a graph showing the change in a multiplexer control signal with change in gradient value for the FIG. 14 embodiment.
Figure 17:
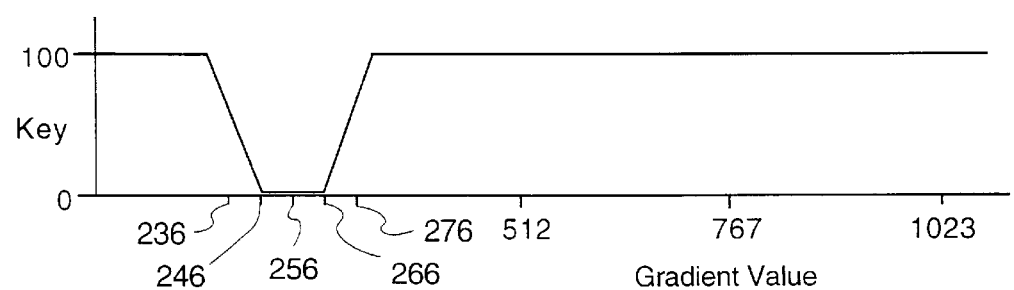
FIG. 17 is a graph showing the change in a video combiner key value with change in gradient value for the FIG. 14 apparatus.

Referring to FIG. 15, the gradient values start at 512 on the left side and go to 1023 on the right side. FIG. 16 shows the 1-bit control signal values stored in RAM LUT 98, and FIG. 17 shows the key values stored in RAM LUT 62. The values in FIGS. 16 and 17 do not change during the wipe. As in the previous example, there is a solid color border with gradual transitions between each video stream and the border.

In order to provide a wipe from video B to video A travelling from left to right, the values provided by source 102 will start at 0 for the first frame, and increase by 1 at each subsequent frame. The value is programmable so that the rate at which the wipe occurs can be varied; in the disclosed example, a simple counter is used, and the wipe advances by one pixel per frame. Subtracter 100 outputs the subtracted value for positive numbers, and outputs zero for negative numbers. At the first frame, 0 will be subtracted from all values in gradient table 106; because all values in the table are greater than 512, the entire screen will show video B (see values for 512 and higher on FIGS. 16 and 17). When the value subtracted at subtracter 100 reaches 236, the first pixel in each line will have the value 276 (512–236) at the address pins for LUTs 62, 98, and the gradual transition from video B to border color will begin. (See FIG. 17). When the value subtracted at subtracter 100 equals 256, the first pixel in each line will have 256 (512–256) at the address pins, and the center of the border (at 256 on FIG. 17) will be entering the left side. When the subtracted value is 266, the first pixel in each line will have 246 (512–266) at the address pins, and the beginning of the transition from the border to video A (at 246 on FIG. 17) will be entering the left side. When the subtracted value is 276, the first values in each line will have 236 (512–276) at the address pins, and the beginning of the all video A (at 236 on FIG. 17) will be entering the left side. When the subtracted value equals 767, the center of the border will be arriving at the right side of the screen (i.e., the values provided to the address pins will be 1023–767, which equals 256; see FIG. 17). When the subtracted value equals 787, there will be all video A on the entire screen.

The embodiment of FIGS. 14–17 is thus simpler than that of FIGS. 7–13, because there is no need to generate and store new values in LUTs 62, 98 between each frame.

Other embodiments of the invention are within the scope of the appended claims. For example, an adder could be used in place of subtracter 100, with different values in table 106 and or the values of FIGS. 16 and 17.

What is claimed is:

1. Apparatus for combining first and second video streams and a border color into a combined output video stream comprising a multiplexer receiving said first and second video streams as input and outputting a single selected video stream in response to a control signal permitting only one of two states, and a video combiner receiving said border color at a first input and said selected video stream from said multiplexer at a second input and outputting a combined output based upon a multibit key value received at a key input, said multibit key value permitting changes in the ratio of the first and second input that are present in the combined output.

2. Apparatus for combining first and second video streams and a border color into a combined output video stream comprising a multiplexer receiving said first and second video streams as input and outputting a selected video stream in response to a control signal, and a video combiner receiving said border color at a first input and said selected video stream from said multiplexer at a second input and outputting a combined output based upon a key value received at a key input, further comprising a control signal memory connected to output said control signal to said multiplexer and a key memory connected to output said key value to said video combiner, said control signal memory and said key memory being connected to be addressed by a sequence of gradient values from a gradient table source.

3. The apparatus of claim 2 wherein said key memory and said control signal memory are random access memories.

4. The apparatus of claim 3, further comprising a processor that provides control signal values stored in said control signal memory and key values stored in said key memory.

5. The apparatus of claim 4 wherein said processor is programmed to provide new said control signal values and key values between frames.

6. The apparatus of claim 2 wherein said key values stored in said key memory gradually change over adjacent gradient values to provide a gradual transition between a border color and a video stream input to said video combiner.

7. The apparatus of claim 2 wherein said gradient table source includes a video memory that also provides said video streams.

8. The apparatus of claim 2 further comprising a subtracter that is connected to subtract an adjustment value from said gradient values and to provide a reduced gradient value to address said control signal memory and said key memory.

9. The apparatus of claim 2 further comprising an adder that is connected to add an adjustment value to said gradient values and to provide an increased gradient value to address said control signal memory and said key memory.

10. The apparatus of claim 8, wherein said adjusment value is changed between frames.

11. The apparatus of claim 9, wherein said adjustment value is changed between frames.

12. The apparatus of claim 8, 9, 10 or 11 wherein said key values stored in said key memory gradually change with respect to adjacent gradient values to provide a gradual transition between a border color and a video stream input to said video combiner.

13. A method for combining first and second video streams and a border color into a combined output video stream comprising receiving said first and second video streams as input at a multiplexer, outputting from said multiplexer a single selected video stream in response to a control signal permitting only one of two states provided to said multiplexer, receiving said border color at a first input of a video combiner, receiving said selected video stream from said multiplexer at a second input of said video combiner, and outputting a combined video output from said video combiner based upon a multibit key received at a key input of said video combiner, said multibit key permitting changes in the ratio of the first and second input that are present in the combined output.

14. The method of claim 13 wherein said control signal is read from a control signal memory connected to output said control signal to said multiplexer, and said key value is read from a key memory connected to output said key value to said video combiner.

15. A method for combining first and second video streams and a border color into a combined output video stream comprising receiving said first and second video streams as input at a multiplexer, outputting from said multiplexer a selected video stream in response to a control signal provided to said multiplexer, receiving said border color at a first input of a video combiner, receiving said selected video stream from said multiplexer at a second input of said video combiner, and outputting a combined video output from said video combiner based upon a key received at a key input of said video combiner, wherein said control signal is read from a control signal memory connected to output said control signal to said multiplexer, and said key value is read from a key memory connected to output said key value to said video combiner, further comprising addressing said control signal memory and said key memory by a sequence of gradient values from a gradient table.

16. The method of claim 15 wherein said control signal memory and said key memory are RAMs, and further comprising providing control signal values from a processor for storage in said control signal memory and key values from a processor for storage in said key memory.

17. The method of claim 16 wherein said processor provides new said control signal values and new said key values to said control signal memory and said key memory between frames.

18. The method of claim 15 wherein said key values stored in said key memory gradually change over adjacent gradient values to provide a gradual transition between a border color and a video stream input to said video combiner.

19. The method of claim 15 further comprising subtracting an adjustment value from said gradient values at a subtracter prior to providing a reduced gradient value to address said control signal memory and said key memory.

20. The method of claim 15 further comprising adding an adjustment value to said gradient values and to provide an increased gradient value to address said control signal memory and said key memory.

21. The method of claim 19, wherein said adjusment value is changed between frames.

22. The method of claim 20, wherein said adjustment value is changed between frames.

23. The method of claim 19, 20, 21 or 22 wherein said key values stored in said key memory gradually change with respect to adjacent gradient values to provide a gradual transition between a border color and a video stream input to said video combiner.

* * * * *